Nov. 17, 1931.  H. McCORMACK  1,831,968
TREATMENT OF WASTE LIQUORS FROM GAS PURIFICATION
Filed March 5, 1931
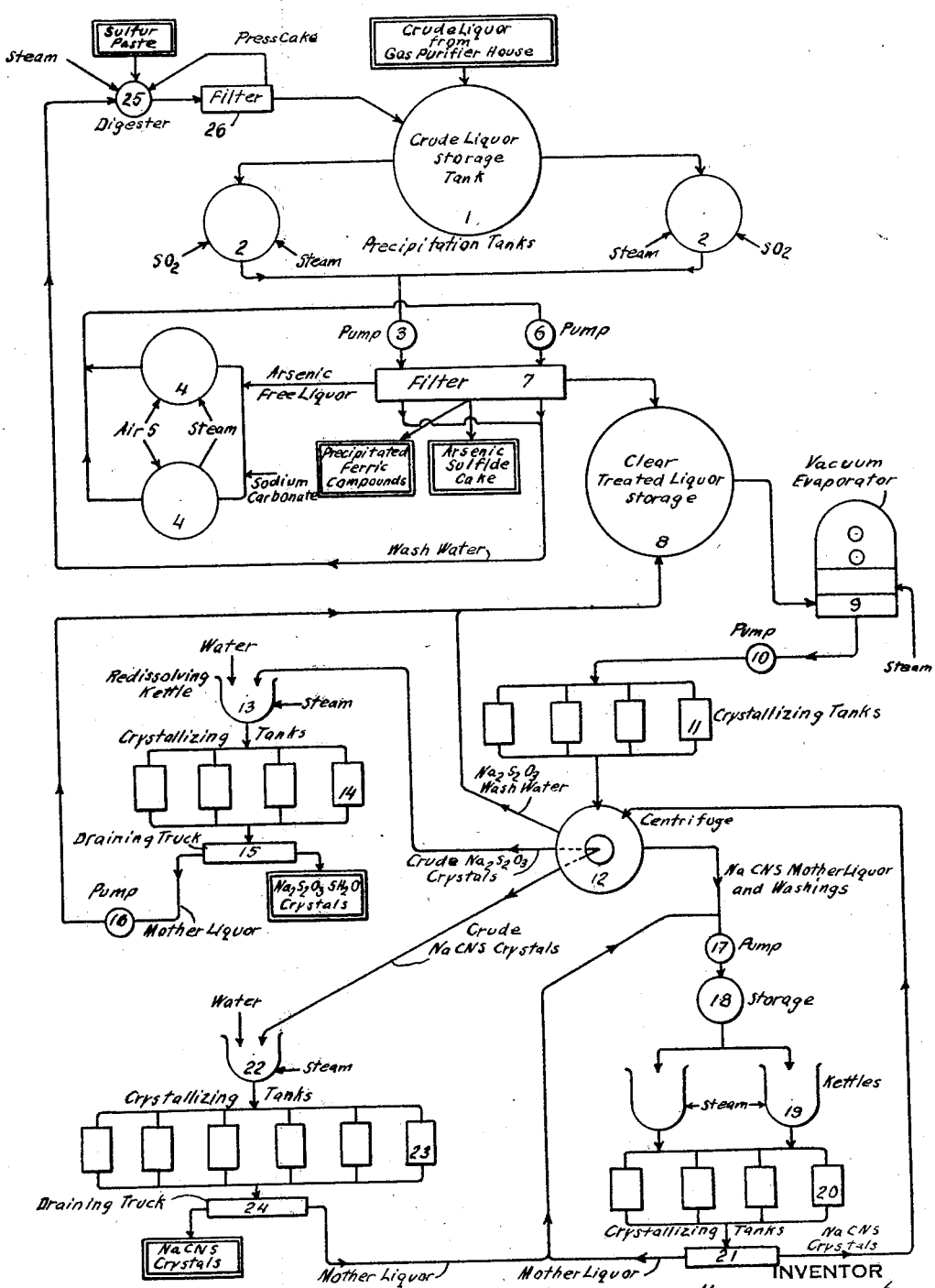

Patented Nov. 17, 1931

1,831,968

UNITED STATES PATENT OFFICE

HARRY McCORMACK, OF CHICAGO, ILLINOIS, ASSIGNOR TO NORTH SHORE COKE & CHEMICAL COMPANY, OF CHICAGO, ILLINOIS, A CORPORATION OF DELAWARE

TREATMENT OF WASTE LIQUORS FROM GAS PURIFICATION

Application filed March 5, 1931. Serial No. 520,316.

This invention relates to improvements in the treatment of waste alkaline liquor from the purification of gases such as coal gas, etc. with alkaline solutions containing arsenic compounds.

More particularly, the invention relates to an improved process of treating such waste alkaline liquors for the recovery therefrom of arsenic sulfide, sodium thiosulfate, and sodium thiocyanate by acidification of the waste alkaline liquors with sulfur dioxide with heating to precipitate arsenic sulfide, treating the resulting arsenic-free liquor with alkali, with heating and aeration to remove impurities such as iron compounds, concentrating the purified liquor to recover sodium thiosulfate therefrom and further treating the liquor for the recovery of sodium thiocyanate, with return or utilization of mother liquors and wash waters in the further carrying out of the process. The invention includes certain novel steps of the process as well as novel combinations of these steps, as will be more fully hereinafter set forth and claimed.

The waste liquors which are treated according to the present process are those produced as by-products or waste liquors from the purification of gas, such as coke oven gas, etc., with alkaline solutions containing arsenic compounds. In the purification of such gases, the gas is brought into contact with the alkaline solution, which is recirculated and aerated, and which serves to remove from the gases sulfur compounds, such as hydrogen sulfide, etc. and cyanogen compounds. Such solutions are alkaline with sodium carbonate and contain arsenic compounds, such as sodium arsenate, etc. Elemental sulfur is formed and precipitated and removed from the liquor. The content of thiosulfate and thiocyanate increases to the point where it becomes necessary to remove the liquor from the system as waste liquor. Similar waste liquor is obtained by systematic washing of the precipitated sulfur. The waste liquor from the purification process, or that from the washing of the precipitated sulfur, forms the raw material for the present process.

The waste liquor contains varying amounts of sodium thiosulfate, sodium thiocyanate, arsenic-sulfur compounds, etc., and it is alkaline in reaction. It may contain, for example, from 110 to 190 grams per liter of sodium thiosulfate ($Na_2S_2O_3.5H_2O$) or from 1 to 1½ pounds per gallon of sodium thiosulfate. It may contain, for example, from 50 to 100 grams per liter of sodium thiocyanate (NaCNS) or .3 to .8 pounds per gallon of sodium thiocyanate. It contains varying amounts of arsenic-sulfur compounds, and it may contain varying amounts of sodium carbonate or bicarbonate and small amounts of other compounds. The relative amounts and proportions of the different constituents will vary somewhat with different waste liquors treated, but the waste liquor will usually contain a much larger proportion of thiosulfate than of thiocyanate.

The waste liquor is first treated to effect substantially complete removal of arsenic compounds therefrom. This is accomplished by treating the alkaline liquor with sulfur dioxide while it is being heated, the sulfur dioxide being added until the liquor is distinctly acid to litmus, after which the addition of sulfur dioxide is discontinued. The heating is continued for a sufficient time, usually several hours, at or just below the boiling point, until a sample lot withdrawn and allowed to settle is clear, and, when treated with an additional quantity of sulfur dioxide gives only a precipitate of sulfur and no further precipitate of arsenic sulfide.

This acidification and heating of the liquor results in substantially complete precipitation of the arsenic from the solution as arsenic sulfide. It is important to regulate the acidity of the solution so that there will be sufficient acid to insure complete precipitation of the arsenic sulfide while avoiding such an excess of acid as will cause decomposition of any appreciable amount of sodium thiosulfate.

The treatment of the alkaline liquor with sulfur dioxide is particularly advantageous for the reason, among others, that the reaction products produced are those which it is desired to recover as products of the process, particularly additional thiosulfate. This treatment has the further advantage of enabling the arsenic to be precipitated with substantial completeness as arsenic sulfide without decomposition of thiosulfate such as would occur with strong acids.

The precipitated arsenic sulfide is removed by filtration and leaves a clear arsenic-free filtrate containing the thiosulfate and thiocyanate in a slightly acid state. This clear filtrate may contain other impurities, such as iron compounds, which can advantageously be removed before the thiosulfate and thiocyanate are recovered from it.

Further purification of the arsenic-free solution is accomplished by making the solution alkaline by the addition of sodium carbonate. A slight precipitate usually results. The alkaline liquor is heated and agitated and aerated, e. g., by bubbling compressed air through the solution, until the ferrous compounds first formed are oxidized to ferric compounds, which can be observed by the change of the color of the precipitate from green to brown and by the fact that a sample of the liquor when filtered remains clear. The precipitate thus formed is removed by filtration, leaving a clear liquor containing the sodium thiosulfate and sodium thiocyanate.

This thiosulfate and thiocyanate liquor is concentrated in a vacuum evaporator until it has a specific gravity of around 1.20 to 1.28, the specific gravity being taken hot. This hot liquor is then allowed to cool in crystallizing tanks to crystallize sodium thiosulfate, giving sodium thiosulfate crystals containing only small amounts of sodium thiocyanate and sodium carbonate. The sodium thiosulfate is removed e. g., by centrifuging and is further purified by redissolving in a small amount of hot water, concentrating until the boiling point of the solution is about 110° C. and recrystallizing to give sodium thiosulfate crystals of high purity. One recrystallization will usually be sufficient, although further purification by recrystallization can be resorted to if necessary.

The mother liquor from the crystallization of the sodium thiosulfate is further concentrated until the boiling point of the solution reaches about 140° C. when the liquor is permitted to cool in crystallizing tanks to give crystals of sodium thiosulfate and sodium thiocyanate, e. g., in the proportions of about 30% sodium thiosulfate and 68% sodium thiocyanate.

The mixed crystals of thiosulfate and thiocyanate are redissolved in a very small amount of hot water and recrystallized, giving a crystalline product made up mainly of sodium thiocyanate, e. g., made up of around 98.6% of sodium thiocyanate and a small amount of sodium thiosulfate. The sodium thiocyanate product can be further purified if necessary or desirable by further recrystallization.

The mother liquor from the first crystallization of the mixed crystals of sodium thiosulfate and sodium thiocyanate is returned and admixed with the concentrated liquor from the evaporator, from which the sodium thiosulfate is first crystallized, thereby eliminating further separate treatment of this mother liquor.

The mother liquor from the second crystallization of the mixed thiosulfate and thiocyanate crystals, which results in the production of sodium thiocyanate crystals containing but little thiosulfate, is returned and admixed with the mother liquor from the first sodium thiosulfate crystallization, where it will be concentrated and handled as a part of the process without separate treatment.

The recrystallization of the sodium thiocyanate will give a product free from sodium thiosulfate and the mother liquor from this further crystallization can also be returned and admixed with the thiocyanate liquor before concentration.

The mother liquors from the various crystallations are advantageously handled in the manner described above, although they may be separately handled without departing from the process in its broader aspects. In the method described above the mother liquors from the recrystallization of the sodium thiosulfate go back to the clear liquor storage tank containing the clear liquor freed from arsenic and iron compounds and which is to be concentrated for the recovery of sodium thiosulfate therefrom. The mother liquors from the recrystallization of the sodium thiocyanate are returned for admixture with the thiocyanate liquors which are to be concentrated for the crystallization of sodium thiocyanate therefrom. The process is thus of a cyclic character so far as the handling of the various mother liquors is concerned.

The process as a whole has the advantage, among others, that the preliminary treatment of the liquor to free it from arsenic as arsenic sulfide and to remove iron and similar impurities, leaves a clear liquor containing sodium thiosulfate and sodium thiocyanate as the only constituents present in any appreciable quantity, so that the return of the mother liquors does not result in the concentration of interfering impurities in the liquor being treated. Should such impurities be present and accumulate to an objectionable extent, the mother liquor can be drawn off and separately treated and interference in the process thereby eliminated.

A flow sheet and an arrangement of apparatus adapted for carrying out the process are shown in a conventional and diagrammatic manner in the accompanying drawing and the invention will be further described in connection therewith but it is intended and will be understood that the invention is illustrated thereby and is not limited thereto.

The crude waste liquor from the gas purifier house where the purification of the gas takes place is collected in the crude storage tank 1; or the wash water produced by systematic washing of the precipitated sulphur is collected in this crude storage tank; or the liquor may be a mixture of crude liquor and of wash liquor.

Two steam heated tanks 2 are provided for alternate batch operation, each being provided with heating coils and with means for introducing sulphur dioxide. Sulphur dioxide is passed into the liquor in one of the tanks until the solution is acid to litmus and the liquor is then kept boiling to precipitate the arsenic sulphide. The liquor and precipitated arsenic sulphide are pumped by the pump 3 to the filter 7 where the arsenic sulphide is removed leaving a clear arsenic-free liquor. The arsenic sulphide is washed and recovered as a product of the process.

The arsenic-free liquor passes to one or the other of two tanks 4, each heated by steam coils and provided with perforated pipes for the introduction of compressed air for aerating the liquor. Sodium carbonate is added to the liquor in one of the tanks 4 until it is distinctly alkaline and the liquor is heated and agitated and aerated for a sufficient time to precipitate and oxidize iron and similar compounds. The rendering of the solution alkaline with sodium carbonate, together with the heating, brings about the precipitation and purification of the liquor while the alkaline condition of the solution prevents or minimizes the decomposition of sodium thiosulphate such as would occur in an acid solution heated for a considerable period of time.

After precipitation of iron and similar compounds the solution is pumped by the pump 6 through the filter 7 to separate the precipitated iron compounds and to give a clear treated liquor which is passed to the storage tank 8. This liquor will be free from arsenic and also free from iron and similar compounds and will contain sodium thiosulphate and sodium thiocyanate as its main constituents.

The wash water from the washing of the arsenic sulphide and of the precipitated compounds can be used for washing the precipitated sulphur paste in the steam heated digester 25 and after separation from the sulfur in the filter 26, can be returned to the crude liquor storage tank 1.

From the clear liquor storage tank 8 the arsenic-free liquor passes to a vacuum evaporator 9 where it is concentrated and from which the concentrated liquor is pumped by the pump 10 to one or another of the crystallizing tanks 11 where it is permitted to stand and cool to crystallize sodium thiosulphate therefrom. The crystals and mother liquor from these tanks are passed to a centrifuge 12 where the crystals are dried and from which the mother liquor is pumped by the pump 17 to the storage tank 18. The sodium thiosulphate crystals are transferred from the centrifuge 12 to a re-dissolving kettle 13 heated by a steam jacket and provided with a stirrer and in which the sodium thiosulphate crystals are re-dissolved. The sodium thiosulphate solution is then transferred to one or another of the crystallizing tanks 14 for recrystallization of the sodium thiosulphate. The crystals thus formed are drained from the mother liquor in a draining truck 15 or other suitable separating apparatus and are thereby obtained in a state of high purity. The mother liquor is pumped by the pump 16 back to the clear treated liquor storage 8. The sodium thiosulphate crystals thus obtained may be further purified if desired by further crystallization but this will not ordinarily be necessary.

The sodium thiocyanate mother liquor collected in the storage tank 18 is passed into one or another of the steam jacketted kettles 19 where it is concentrated to a boiling point of about 137° C. after which the concentrated liquor is run to one or another of the crystallizing tanks 20 where the sodium thiocyanate is permitted to crystallize, in admixture with more or less sodium thiosulphate. The crystals are separated from the mother liquor in the draining truck or similar equipment 21 from which the crystals are transferred to the centrifuge 12 to free them from adhering liquor. The mother liquor from the separator 21 is returned to the storage tank 18, as indicated in the drawing, or it can be returned to the clear liquor storage tank 8 along with the liquor drained from the crystals in the centrifuge 12.

The crude sodium thiocyanate crystals are conveyed from the centrifuge 12 to a steam heated re-dissolving tank 22 where they are re-dissolved in hot water and then transferred to the recrystallizing tanks 23 for recrystallization, after which the sodium thiocyanate crystals are separated from the mother liquor in the draining truck or similar equipment 24, from which the mother liquor can be returned to the storage tank 18, as shown, or to the storage tank 8. The sodium thiocyanate crystals can be further purified if necessary or desirable by further crystallization, the mother liquor from any such further crystallization being similarly returned to the storage tank 18.

The amounts of the various materials recovered from the process will vary with the composition of the liquor treated and with the relative amounts and proportions of ingredients which it contains. Using a waste liquor having a specific gravity of 1.155 measured at 30° C. there may be obtained, for example, around 350 pounds or more of arsenic sulphide representing around 225 pounds or so of dried product; around 25 to 30 pounds of precipitated iron compounds, around 1,200 pounds of sodium thiosulphate crystals and around 770 pounds of sodium thiocyanate. It will of course be understood that these amounts are illustrative and that the amounts and relative proportions may vary considerably from those indicated.

It will thus be seen that the present invention provides an improved process of treating waste alkaline liquor containing arsenic compounds to recover arsenic sulphide in precipitated form, and sodium thiosulphate and sodium thiocyanate in a state of commercial purity. It will be seen that the treatment of the waste liquor converts it from an alkaline condition to a slightly acid condition by the use of sulphur dioxide which has the advantage of producing constituents already present in the liquor, e. g., additional thiosulphate, and which has the advantage of enabling the solution to be heated and of causing precipitation of arsenic sulphide without objectionable decomposition of sodium thiosulphate. It will further be noted that the process which thus produces an arsenic-free acid liquor is then made alkaline and further purified if desired to remove iron compounds and the like leaving a clear liquor containing sodium thiosulphate and sodium thiocyanate as practically its only constituents; and these constituents are thereafter recovered by crystallization and obtained as commercial products while the other liquors from the crystallizations and recrystallizations are returned to the process and their contents of the salts recovered therefrom in the further carrying out of the process.

The particular method of recovering the thiosulphate and the thiocyanate from the clear arsenic-free liquor is an advantageous one; but it is one advantage of the preliminary treatment of the alkaline liquor with sulphur dioxide that it gives an arsenic-free liquor adapted for treatment by various methods of treatment to recover the thiosulphate and thiocyanate therefrom; although I consider it particularly advantageous to recover these salts in the manner above described.

I claim:

1. The method of treating waste alkaline liquors containing sodium thiosulfate and arsenic-sulfur compounds and resulting from the purification of gases with alkaline solutions containing arsenic compounds which comprises acidifying such liquor with sulfur dioxide and heating the same to precipitate arsenic sulfide therefrom.

2. The further improvement in the process of claim 1, in which the arsenic-free liquor is made alkaline and heated under oxidizing conditions to precipitate ferric compounds from the solution.

3. The method of treating waste alkaline liquors containing sodium thiosulfate and arsenic-sulfur compounds and resulting from the purification of gases with alkaline solutions containing arsenic compounds which comprises adding sulfur dioxide to the liquor until it is distinctly acid to litmus while avoiding a large excess of acid and heating the solution to a temperature around its boiling point to effect substantially complete precipitation of the arsenic present as arsenic sulfide while avoiding objection decomposition of sodium thiosulfate.

4. The method of treating watse alkaline liquors containing sodium thiosulfate, sodium thiocyanate and arsenic-sulfur compounds and resulting from the purification of gases with alkaline solutions containing arsenic compounds, which comprises acidifying such liquor with sulfur dioxide and heating the same to precipitate arsenic sulfide therefrom, removing the precipitated arsenic sulfide, concentrating the arsenic-free liquor and crystallizing sodium thiosulfate therefrom.

5. The process according to claim 4 in which the mother liquor from the crystallization of the sodium thiosulfate is further concentrated and sodium thiocyanate crystallized therefrom in admixture with some sodium thiosulfate.

6. The method of recovering sodium thiosulfate from arsenic-free liquors containing sodium thiosulfate and sodium thiocyanate which comprises concentrating such liquor to a specific gravity of about 1.20 to 1.28 and cooling the concentrated liquor to crystallize sodium thiosulfate therefrom.

7. The further improvement in the process of claim 6 in which the mother liquor from the crystallization of the sodium thiosulfate is further concentrated until the boiling point of the solution reaches about 140° C. and the concentrated liquor then cooled to crystallize sodium thiocyanate therefrom admixed with some sodium thiosulfate, which crystals are further recrystallized to give sodium thiocyanate substantially free from sodium thiosulfate.

8. The method of treating waste alkaline liquors containing sodium thiosulfate, sodium thiocyanate and arsenic-sulfur compounds and resulting from the purification of gases with alkaline solutions containing arsenic compounds, which comprises treating such liquor with sulfur dioxide and heating the same to precipitate arsenic sulfide therefrom, removing the precipitated arsenic sulfide, making the liquor alkaline and heating and oxidizing the same to precipitate ferric compounds, removing such precipitated compounds and thereby obtaining a clear arsenic-free liquor containing mainly sodium thiosulfate and sodium thiocyanate, concentrating such liquor and cooling the same to crystallize sodium thiosulfate therefrom, recrystallizing the sodium thiosulfate, and returning the mother liquor from the recrystallization for admixture with the arsenic-free liquor before concentration.

9. The method of treating waste alkaline liquors containing sodium thiosulfate, sodium thiocyanate and arsenic-sulfur compounds and resulting from the purification of gases with alkaline solutions containing arsenic compounds, which comprises treating such liquor with sulfur dioxide and heating the same to precipitate arsenic sulfide therefrom, removing the precipitated arsenic sulfide, making the liquor alkaline and heating and oxidizing the same to precipitate ferric compounds, removing such precipitated compounds and thereby obtaining a clear arsenic-free liquor containing mainly sodium thiosulfate and sodium thiocyanate, concentrating such liquor and cooling the same to crystallize sodium thiosulfate therefrom, further concentrating the mother liquor from such crystallization and cooling the concentrating liquor to crystallize sodium thiocyanate therefrom admixed with some sodium thiosulfate, recrystallizing such crystals to give sodium thiocyanate relatively free from sodium thiosulfate, and returning the mother liquors from both crystallizations for admixture with liquors to be concentrated in the further carrying out of the process.

In testimony whereof I affix my signature.

HARRY McCORMACK.